(12) United States Patent
Veilleux, Jr. et al.

(10) Patent No.: US 10,711,701 B2
(45) Date of Patent: Jul. 14, 2020

(54) MANUAL BOWED ROTOR AND FULL OVERRIDE

(71) Applicant: Hamilton Sundstrand Corporation, Charlotte, NC (US)

(72) Inventors: Leo J. Veilleux, Jr., Wethersfield, CT (US); Boris N. Grigorov, Granby, CT (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 419 days.

(21) Appl. No.: 15/615,135

(22) Filed: Jun. 6, 2017

(65) Prior Publication Data

US 2018/0346100 A1 Dec. 6, 2018

(51) Int. Cl.
*F02C 7/27* (2006.01)
*F16K 11/072* (2006.01)
*F16K 31/42* (2006.01)
*F02C 7/277* (2006.01)
*F16K 31/05* (2006.01)
(Continued)

(52) U.S. Cl.
CPC .......... *F02C 7/27* (2013.01); *F01D 25/10* (2013.01); *F01D 25/34* (2013.01); *F02C 7/277* (2013.01); *F16K 11/072* (2013.01); *F16K 31/055* (2013.01); *F16K 31/42* (2013.01); *F01D 19/00* (2013.01); *F05D 2260/85* (2013.01)

(58) Field of Classification Search
CPC ........ F16K 31/05; F16K 31/055; F16K 31/14; F16K 11/085; F16K 11/0853; F16K 35/027; F01D 19/00; F01D 19/02; F01D 25/34; F01D 21/00; F01D 21/06; F05D 2260/85; F05D 2270/095; F02C 7/26; F02C 7/268; F02C 7/27; F02C 7/275; F02C 7/277
USPC ............................. 251/30.01, 25, 28
See application file for complete search history.

(56) References Cited

U.S. PATENT DOCUMENTS 2,961,586 A * 11/1960 Morrell ................... F16K 31/00
                                              318/611
4,805,873 A *  2/1989 Mouton ................... F02C 7/277
                                              251/30.05

(Continued)

OTHER PUBLICATIONS

The Extended European Search Report for Application No. 18176253.5-1007; dated Oct. 31, 2018; dated Nov. 14, 2018; 8 pages.

*Primary Examiner* — Andrew H Nguyen
*Assistant Examiner* — Stephanie Cheng
(74) *Attorney, Agent, or Firm* — Cantor Colburn LLP (57) ABSTRACT

A starter air valve comprising a housing comprising an inlet at a first end and an outlet at a second end opposite the first end, the inlet being fluidly connected to the outlet through a fluid pathway; a valve injected into the fluid pathway dividing the fluid pathway into a first chamber and second chamber, the valve in operation adjusts fluid flow through fluid pathway; an actuator operably connected to the valve; a solenoid in variable electrical connection with the actuator; and a rotary spool valve fluidly connected to the first chamber, the rotary spool valve operable to rotate to at least one of a normal start position, a full manual override position, and a plurality of partial manual override positions, wherein the rotary spool valve is in variable fluid connection with the actuator, wherein the solenoid is in variable electrical connection with the actuator through the rotary spool valve.

12 Claims, 7 Drawing Sheets

(51) Int. Cl.
*F01D 19/00* (2006.01)
*F01D 25/34* (2006.01)
*F01D 25/10* (2006.01)

(56) References Cited

U.S. PATENT DOCUMENTS

| | | | |
|---|---|---|---|
| 4,841,816 A * | 6/1989 | Bullock | F16H 61/12 |
| | | | 477/131 |
| 4,916,437 A * | 4/1990 | Gazzaz | F17D 5/02 |
| | | | 251/129.01 |
| 6,684,898 B2 * | 2/2004 | Wiggins | F02C 7/277 |
| | | | 137/15.25 |
| 6,694,746 B2 * | 2/2004 | Reed | F02C 7/047 |
| | | | 137/488 |
| 7,475,863 B2 * | 1/2009 | Donovan | F16K 31/402 |
| | | | 251/285 |
| 7,650,905 B2 * | 1/2010 | Kubota | F16K 31/1635 |
| | | | 137/554 |
| 8,201,572 B2 * | 6/2012 | Segal | E03B 7/071 |
| | | | 137/15.11 |
| 9,157,374 B2 * | 10/2015 | Cortelli | F02C 7/27 |
| 2004/0000656 A1 | 1/2004 | Wiggins et al. | |
| 2010/0085676 A1 * | 4/2010 | Wilfert | F02N 11/08 |
| | | | 361/170 |
| 2012/0067062 A1 | 3/2012 | Veilleux, Jr. | |
| 2012/0211681 A1 * | 8/2012 | Wang | F16K 31/1635 |
| | | | 251/30.01 |
| 2014/0060076 A1 | 3/2014 | Cortelli et al. | |
| 2015/0308578 A1 * | 10/2015 | Block, III | F04B 43/1269 |
| | | | 137/1 |

* cited by examiner

MANUAL BOWED ROTOR AND FULL OVERRIDE

BACKGROUND

The embodiments herein generally relate to starter air valves used to start gas turbine engines and more specifically, the manual overrides for the starter air valve.

Many relatively large gas turbine engines, including turbofan engines, may use an air turbine starter (ATS) to initiate gas turbine engine rotation. The ATS is typically mounted on the accessory gearbox which, in turn, is mounted on the engine or airframe. Consequently, the ATS is installed in the aircraft at all times even though active operation may occur only for a minute or so at the beginning of each flight cycle, along with occasional operation during engine maintenance activities.

The ATS generally includes a turbine section coupled to an output section within a housing. The turbine section is coupled to a high pressure fluid source, such as compressed air, to drive the output section through a gear system. Thus, when the high pressure fluid source impinges upon the turbine section, the output section powers the gas turbine engine.

When the gas turbine engine of an airplane has been shut off for example, after the airplane has landed at an airport, the engine is hot and due to heat rise, the upper portions of the engine will be hotter than lower portions of the engine. When this occurs thermal expansion may cause deflection of components of the engine which can result in a "bowed rotor" condition. If a gas turbine engine is in such a bowed rotor condition, it is undesirable to restart or start the engine. One approach to mitigating a bowed rotor condition is to use the ATS to drive rotation (i.e., cool-down motoring) of a spool within the engine for an extended period of time at a selected speed and is referred to as Bowed Rotor Motoring (BRM). Enhancements to improve the efficiency of BRM are greatly desired.

BRIEF DESCRIPTION

According to one embodiment, a starter air valve is provided. The starter air valve comprises: a housing comprising an inlet at a first end and an outlet at a second end opposite the first end, the inlet being fluidly connected to the outlet through a fluid pathway; a valve projecting into the fluid pathway dividing the fluid pathway into a first chamber and a second chamber, the valve in operation adjusts fluid flow through the fluid pathway; an actuator operably connected to the valve; a solenoid; and a rotary spool valve fluidly connected to the first chamber of the fluid pathway, the rotary spool valve operable to rotate to at least one of a normal start position, a full manual override position, and a plurality of partial manual override positions, wherein the rotary spool valve is in variable fluid connection with the actuator.

In addition to one or more of the features described above, or as an alternative, further embodiments may include where the rotary spool valve electrically connects to the solenoid when the rotary spool valve is in the normal start position.

In addition to one or more of the features described above, or as an alternative, further embodiments may include where the rotary spool valve electrically disconnects from the solenoid when the rotary spool valve is in the full manual override position.

In addition to one or more of the features described above, or as an alternative, further embodiments may include where the rotary spool valve electrically disconnects from the solenoid when the rotary spool valve is in each of the plurality of partial manual override positions.

In addition to one or more of the features described above, or as an alternative, further embodiments may include where the rotary spool valve is fluidly connected to actuator through the solenoid when the rotary spool valve is in the normal start position.

In addition to one or more of the features described above, or as an alternative, further embodiments may include where the rotary spool valve is fluidly connected the actuator when the rotary spool valve is in the full manual override start position.

In addition to one or more of the features described above, or as an alternative, further embodiments may include where the rotary spool valve is fluidly disconnected from the actuator when the rotary spool valve is in each of the plurality of partial manual override start positions; the first chamber is in fluid connection to the second chamber through the rotary spool valve when the rotary spool valve is in each of the plurality of partial manual override start positions; and each of the plurality of partial manual override start positions allows a different amount of fluid through the rotary spool valve.

In addition to one or more of the features described above, or as an alternative, further embodiments may include where the rotary spool valve electrically connects to the solenoid when the rotary spool valve is in the normal start position.

In addition to one or more of the features described above, or as an alternative, further embodiments may include where the rotary spool valve electrically disconnects from the solenoid when the rotary spool valve is in the full manual override position.

In addition to one or more of the features described above, or as an alternative, further embodiments may include where the rotary spool valve electrically disconnects from the solenoid when the rotary spool valve is in each of the plurality of partial manual override positions.

According to another embodiment, an engine starting system for a gas turbine engine is provided. The engine starting system comprising: an air turbine starter; a compressed air source fluidly connected to the air turbine starter; a starter air valve fluidly connecting the air turbine starter to the compressed air source, the starter air valve comprising: a housing comprising an inlet at a first end and an outlet at a second end opposite the first end, the inlet being fluidly connected to the outlet through a fluid pathway; a valve projecting into the fluid pathway dividing the fluid pathway into a first chamber and a second chamber, the valve in operation adjusts fluid flow through the fluid pathway; an actuator operably connected to the valve; a solenoid; and a rotary spool valve fluidly connected to the first chamber of the fluid pathway, the rotary spool valve operable to rotate to at least one of a normal start position, a full manual override position, and a plurality of partial manual override positions, wherein the rotary spool valve is in variable fluid connection with the actuator.

In addition to one or more of the features described above, or as an alternative, further embodiments may include where the rotary spool valve electrically connects to the solenoid when the rotary spool valve is in the normal start position.

In addition to one or more of the features described above, or as an alternative, further embodiments may include where the rotary spool valve electrically disconnects from the solenoid when the rotary spool valve is in the full manual override position.

In addition to one or more of the features described above, or as an alternative, further embodiments may include where the rotary spool valve electrically disconnects from the solenoid when the rotary spool valve is in each of the plurality of partial manual override positions.

In addition to one or more of the features described above, or as an alternative, further embodiments may include where the rotary spool valve is fluidly connected to actuator through the solenoid when the rotary spool valve is in the normal start position.

In addition to one or more of the features described above, or as an alternative, further embodiments may include where the rotary spool valve is fluidly connected the actuator when the rotary spool valve is in the full manual override start position.

In addition to one or more of the features described above, or as an alternative, further embodiments may include where the rotary spool valve is fluidly disconnected from the actuator when the rotary spool valve is in each of the plurality of partial manual override start positions; the first chamber is in fluid connection to the second chamber through the rotary spool valve when the rotary spool valve is in each of the plurality of partial manual override start positions; and each of the plurality of partial manual override start positions allows a different amount of fluid through the rotary spool valve.

In addition to one or more of the features described above, or as an alternative, further embodiments may include where the rotary spool valve electrically connects to the solenoid when the rotary spool valve is in the normal start position.

In addition to one or more of the features described above, or as an alternative, further embodiments may include where the rotary spool valve electrically disconnects from the solenoid when the rotary spool valve is in the full manual override position.

In addition to one or more of the features described above, or as an alternative, further embodiments may include where the rotary spool valve electrically disconnects from the solenoid when the rotary spool valve is in each of the plurality of partial manual override positions.

Technical effects of embodiments of the present disclosure include adjusting the flow of air through a starter air valve using a manual override having selected settings to control flow rates and electrical connections.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Various embodiments of the present disclosure are related to a bowed rotor start mitigation system in a gas turbine engine. Embodiments can include using a manual override to adjust the flow of air through an air starter valve system of an air turbine starter. The flow of air controls rotor speed of a starting spool of a gas turbine engine to mitigate a bowed rotor condition using a bowed rotor motoring process. Under normal operation during bowed rotor motoring, a solenoid operably connected to the starter air valve can be actively adjusted to deliver air pressure (i.e., compressed air) from an air supply to an air turbine starter of an engine starting system that controls starting spool rotor speed. Bowed rotor motoring may be performed by running an engine starting system at a lower speed with a longer duration than typically used for engine starting while dynamically adjusting the starter air valve to maintain a rotor speed and/or profile. A system failure may lead to the solenoid being unable to adjust the air pressure through the starter air valve. A few non limiting examples of system failures may include, a starter air valve solenoid electrical failure, a solenoid electronic coil control failure, the solenoid being mechanically stuck open, the solenoid being mechanically stuck close, a sluggish starter air valve, and the starter air valve being stuck closed due to an obstruction. In the event of a system failure, the manual override described herein may be activated. The manual override may be set to one or more selected positional settings to precisely control the flow of air through the starter air valve. Advantageously, by controlling the flow of air through the starter air valve using the manual override, bowed motor motoring may be tailored based on actual conditions, which leads to faster and more effective bowed rotor motoring.

Figure 1:
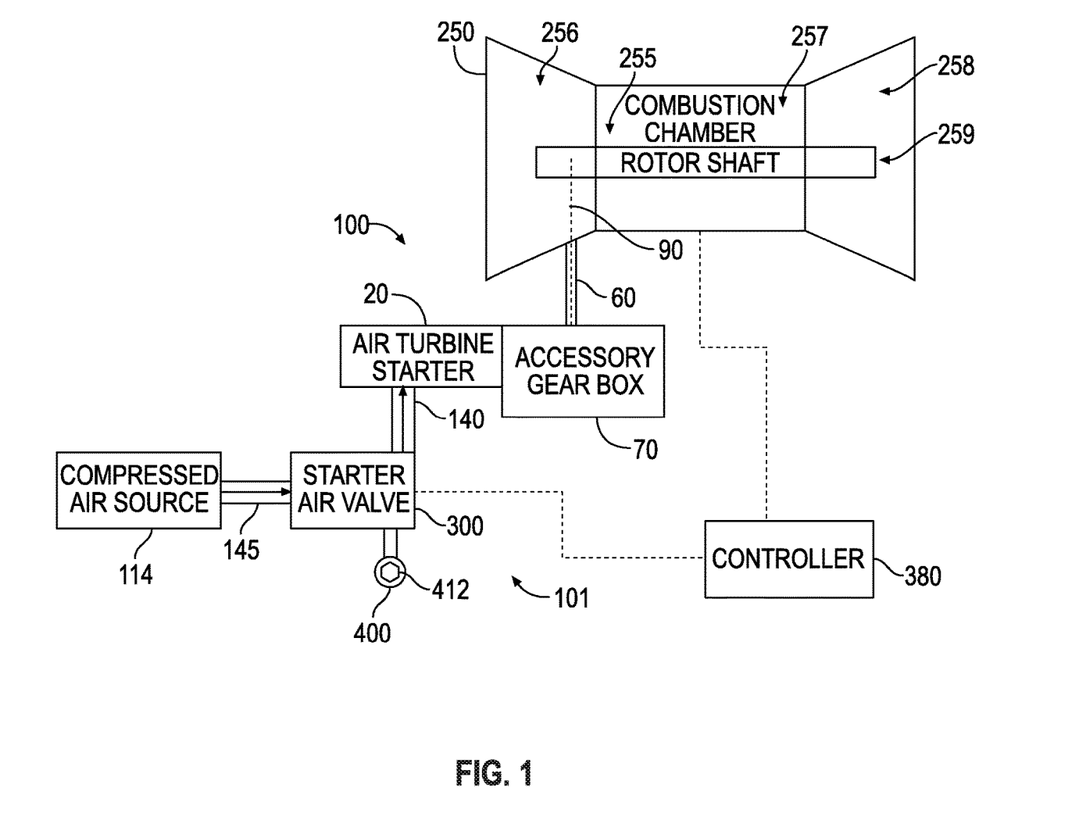
FIG. 1 is a schematic illustration of an aircraft engine starting system, according to an embodiment of the disclosure.

Referring now to the figures, FIG. 1 shows a block diagram of a gas turbine engine 250 and an associated engine starting system 100 with a valve system 101 according to an embodiment of the present disclosure. The valve system 101 includes a starter air valve 300 and manual override 400. The valve system 101 is operable to receive a compressed air flow from a compressed air source 114 through one or more ducts 145. The compressed air source 114 can be an auxiliary power unit, a ground cart, or a cross-engine bleed.

An air turbine starter 20 of the engine starting system 100 is operably connected to the gas turbine engine 250 through an accessory gearbox 70 and drive shaft 60 (e.g., a tower shaft), as shown in FIG. 1. As depicted in the example of FIG. 1, the air turbine starter 20 is connected to the gas turbine engine 250 by a drive line 90, which runs from an output of the air turbine starter 20 to the accessory gearbox 70 through the drive shaft 60 to a rotor shaft 259 of the gas turbine engine 250. Operable connections can include gear mesh connections that in some instances can be selectively engaged or disengaged, for instance, through one or more clutches. The air turbine starter 20 is configured to initiate a startup process of the gas turbine engine 250 driving rotation of the rotor shaft 259 of a starting spool 255 of the gas turbine engine 250. The rotor shaft 259 operably connects an engine compressor 256 to an engine turbine 258. Thus, once the engine compressor 256 starts spinning, air is pulled into combustion chamber 257 and mixes with fuel for combustion. Once the air and fuel mixture combusts in the combustion chamber 257, a resulting compressed gas flow drives rotation of the engine turbine 258, which rotates the engine turbine 258 and subsequently the engine compressor 256. Once the startup process has been completed, the air turbine starter 20 can be disengaged from the gas turbine engine 250 to prevent over-speed conditions when the gas turbine engine 250 operates at its normal higher speeds. Although only a single instance of an engine compressor-turbine pair of starting spool 255 is depicted in the example of FIG. 1, it will be understood that embodiments can include any number of spools, such as high/mid/low pressure engine compressor-turbine pairs within the gas turbine engine 250.

The air turbine starter 20 is further operable to drive rotation of the rotor shaft 259 at a lower speed for a longer duration than typically used for engine starting in a motoring mode of operation (also referred to as cool-down motoring/bowed rotor motoring) to prevent/reduce a bowed rotor condition. If a bowed rotor condition has developed, for instance, due to a hot engine shutdown and without taking further immediate action, bowed rotor motoring may be performed by the air turbine starter 20 to reduce a bowed rotor condition by driving rotation of the rotor shaft 259.

A controller 380, such as full authority digital engine control (FADEC), typically controls valve operation, for instance, modulation of the starter air valve 300 to control a motoring speed of the gas turbine engine 250 during bowed rotor motoring. The starter air valve 300 delivers air through a duct 140 to the air turbine starter 20. If the starter air valve 300 fails shut, a corresponding manual override 400 can be used to manually open the starter air valve 300. The manual override 400 can include a tool interface 412 to enable a ground crew to open the starter air valve 300. When starter air valve 300 fails shut and manual override 400 can be used to open the starter air valve 300.

Figure 2:
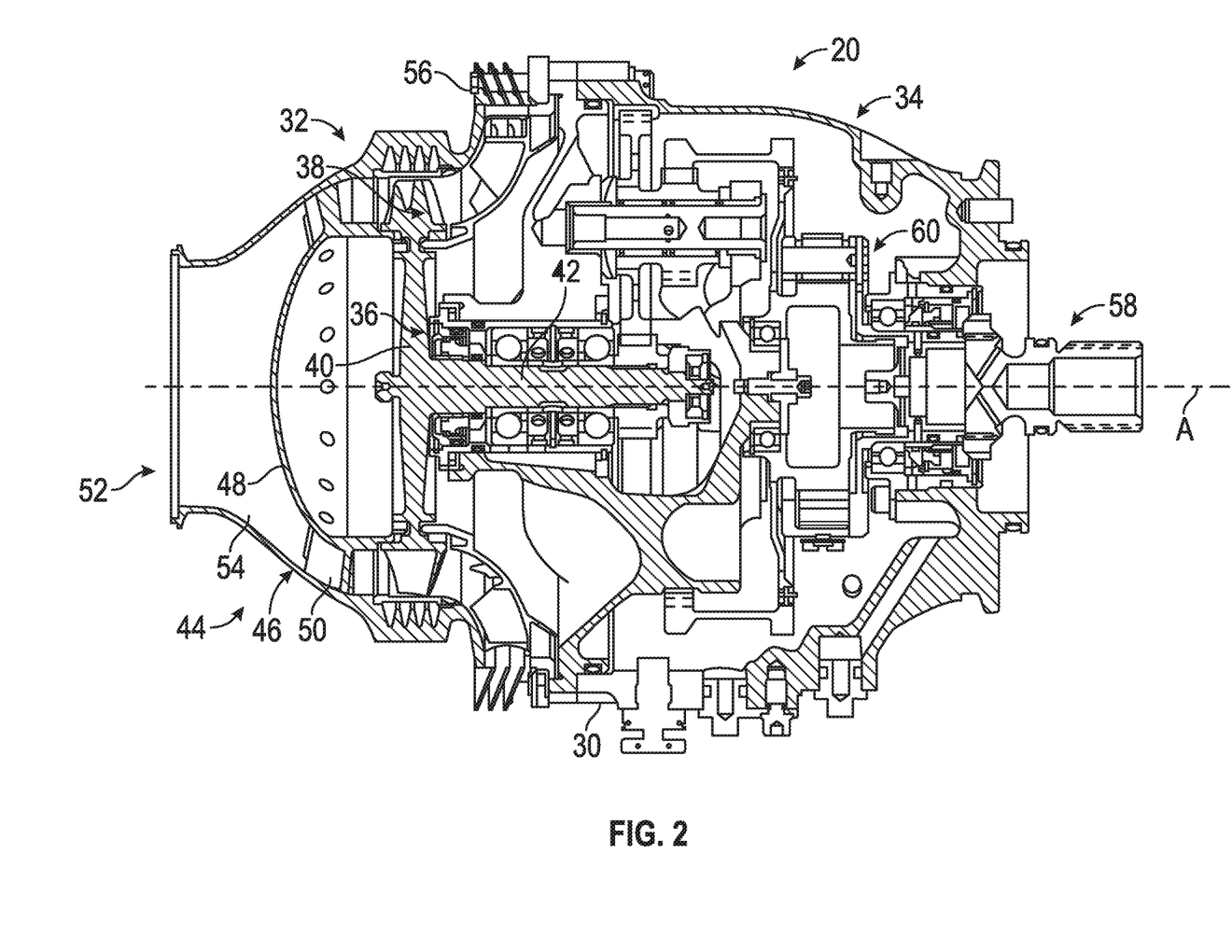
FIG. 2 is a schematic illustration an air turbine starter of the aircraft engine starting system of FIG. 1, according to an embodiment of the disclosure.
Figure 3:
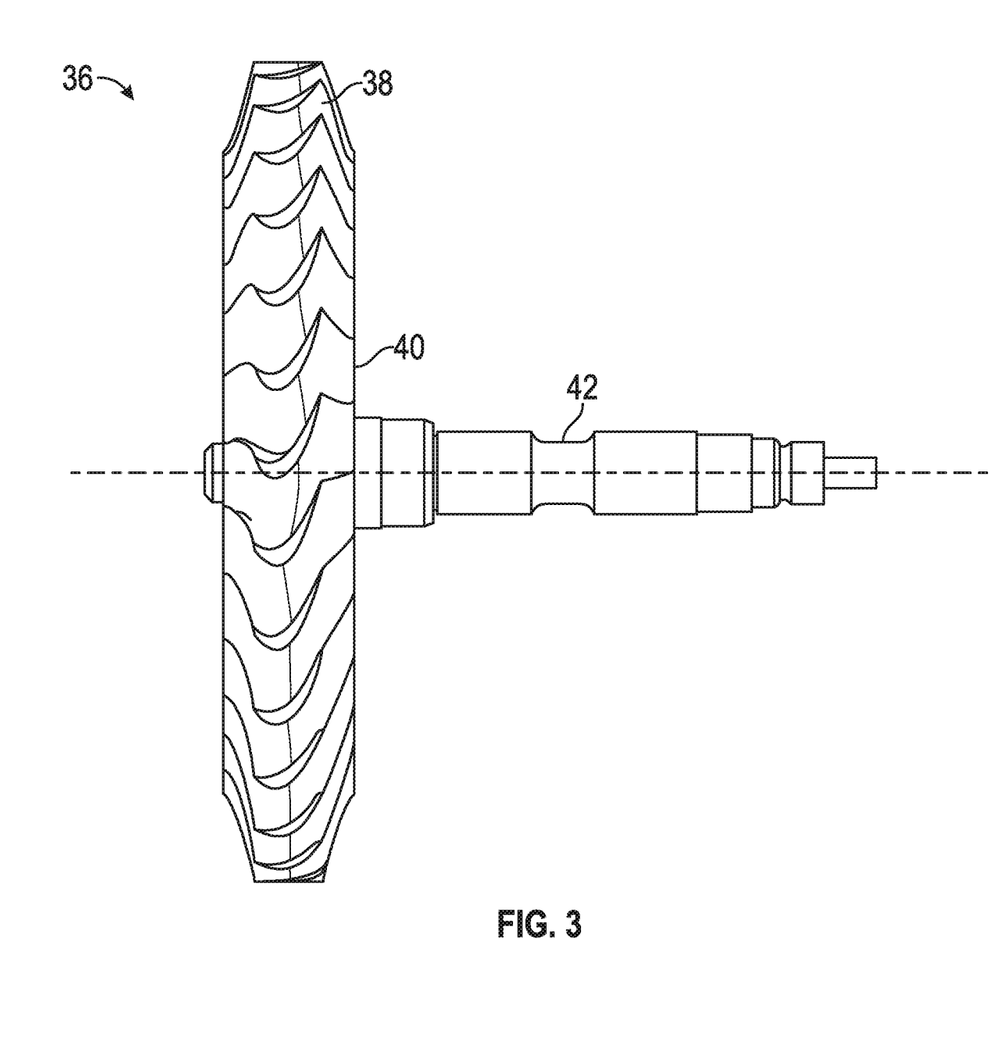
FIG. 3 is a schematic illustration a turbine wheel of the air turbine starter of FIG. 2, according to an embodiment of the disclosure.

Referring now to FIGS. 2 and 3. FIG. 2 schematically illustrates an air turbine starter 20 that is used to initiate the rotation of a gas turbine engine 250, such as a turbofan engine through an accessory gearbox 70, as described above. The air turbine starter 20 generally includes a housing assembly 30 that includes at least a turbine section 32 and an output section 34. The turbine section 32 includes a turbine wheel 36 with a plurality of turbine blades 38, a hub 40, and a turbine rotor shaft 42. The turbine blades 38 of the turbine wheel 36 are located downstream of an inlet housing assembly 44 which includes an inlet housing 46 which contains a nozzle 48. The nozzle 48 includes a plurality of turbine vanes 50 which direct compressed air flow from an inlet 52 through an inlet flowpath 54. The compressed air flows past the vanes 50 drives the turbine wheel 36 then is exhausted through an outlet 56.

The turbine wheel 36 is driven by the compressed airflow such that the turbine rotor shaft 42 may mechanically drive a starter output shaft 58 though a gear system 60, such as a planetary gear system. The air turbine starter 20 thereby transmits relatively high loads through the gear system 60 to convert the pneumatic energy from the compressed air into mechanical energy to, for example, rotate the gas turbine engine 250 for start and/or bowed rotor motoring.

The turbine blades 38 of the turbine wheel 36 and the vanes 50 of the nozzle 48 both of which are defined herein as airfoils—may be defined with computational fluid dynamics (CFD) analytical software and are optimized to meet the specific performance requirements of a specific air turbine starter. Some key engine characteristics which must be known to design an air turbine starter are the engine core inertia (the portion of the engine which is actually rotated by the air turbine starter), the engine core drag torque as a function of speed, other drag torques (such as from gearbox mounted accessories) as a function of speed, and the maximum time allowed for the start. Values of these parameters are needed for the range of ambient starting temperature conditions. From these, the air turbine starter a preferred internal gear ratio for the starter and, using the CFD tools, the optimum airfoil shape which is most efficient can be determined for each particular air turbine starter. Depending on the values of the original requirements, the airfoil shape will be different, and will be optimized to perform with highest efficiency at the design speed of the starter.

Characteristics of the airfoil shape may change from one airfoil shape to another and may include, but are not limited to, curvature, maximum thickness, axial chord length, twist, taper from root to tip, radius of the leading edge, radius of the trailing edge, straightness of the leading and trailing edge from root to tip, etc. It is possible to directly scale up or scale down the airfoil shape to meet a different set of engine starting requirements, however, if the entire flowpath geometry, to include the rotor blades 38, vanes 50 and inlet flowpath 54 is not also scaled using the same scale factor, the delivered performance of the air turbine starter may not properly scale.

Figure 4:
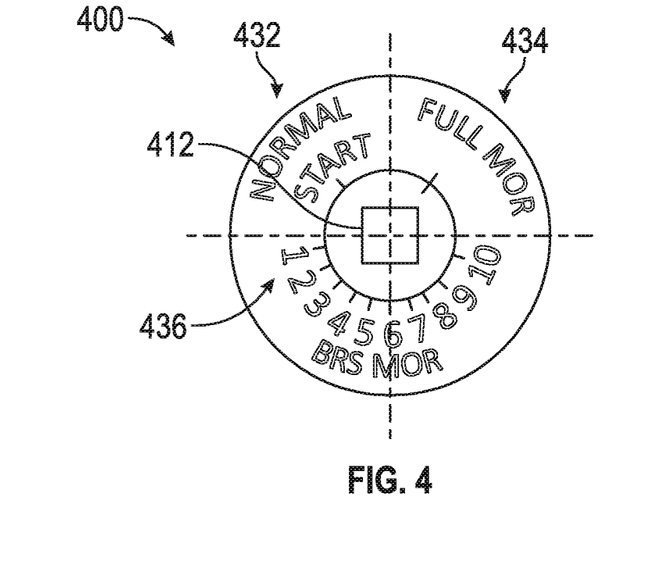
FIG. 4 is a schematic illustration top view of a manual override of a starter air valve that may be used in the aircraft engine starting system of FIG. 1, according to an embodiment of the disclosure.

Referring now to FIG. 4, which schematically illustrates a top view of the manual override 400. The manual override 400 includes a plurality of positional settings that each vary the amount of air flowing through the starter air valve 300 by rotating a rotary spool valve 420 (see FIGS. 6 and 7). The rotary spool valve 420 is operable to rotate to at least one of a normal start position 432, a full manual override position 434, and a plurality of partial manual override positions 436, as seen in FIG. 4. The rotary spool valve 420 is rotated by a manual input at the tool interface 412.

Figure 5:
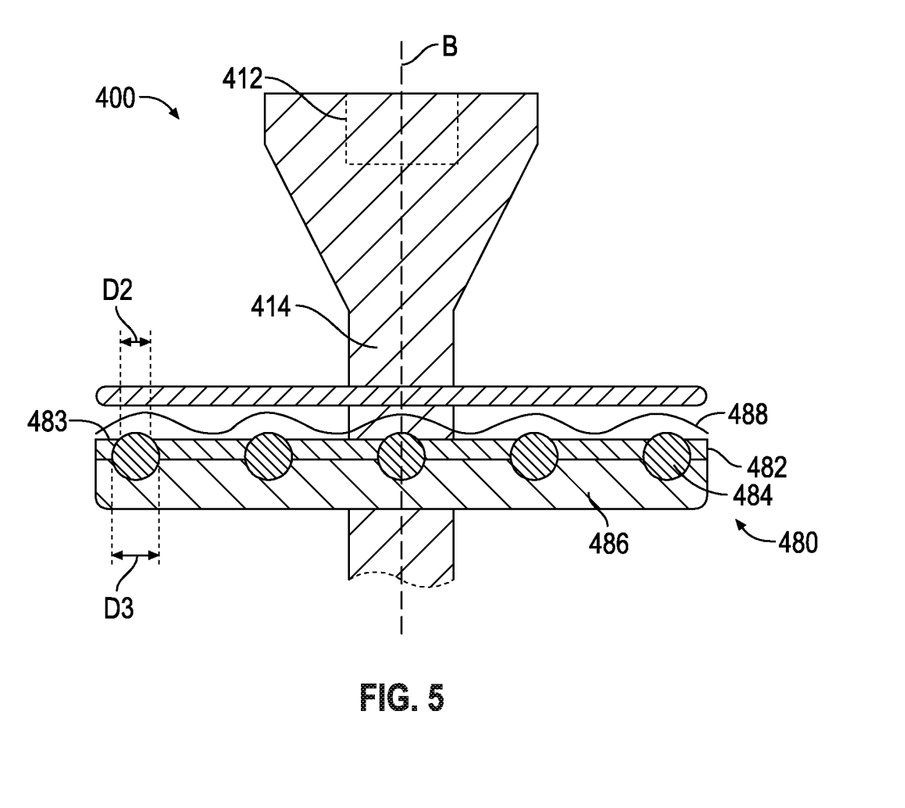
FIG. 5 is a cross-sectional schematic illustration of a portion of the manual override of FIG. 4, according to an embodiment of the disclosure.

Referring now to FIG. 5, which schematically illustrates a cross-sectional portion of an indexing mechanism 480 of the manual override 400. As seen in FIG. 5, the manual override 400 utilizes a spring 488, a ball holder plate 482, and indexing ring 486 with balls 484 in order for a worker to manually rotate the rotary spool valve 420 through each position 432, 434, 436. FIG. 5 illustrates an indexing mechanism 480 configured to translate the rotation of the manual override 400 to a series of step movements. In the illustrated example of FIG. 5, the plate 486 containing the balls 484 rotates with the manual override shaft 414. The plate 482 is configured not to rotate with the manual override shaft 414. The plate 482 may move along shaft axis B of manual override shaft 414 but the plate 482 is biased in place by the spring 488. Plate 482 includes a plurality of openings 483 each with diameters D2 slightly smaller than the diameter D3 of the balls 484. When the manual override shaft 414 and indexing ring 486 is rotated, the rotation causes the ball holder plate 482 to be lifted to compress the spring 488 and balls 484 are seated with a click in the next available opening 483 of 482. The rotary spool valve 420 is rotated by a manual input at the tool interface 412.

Figure 6:
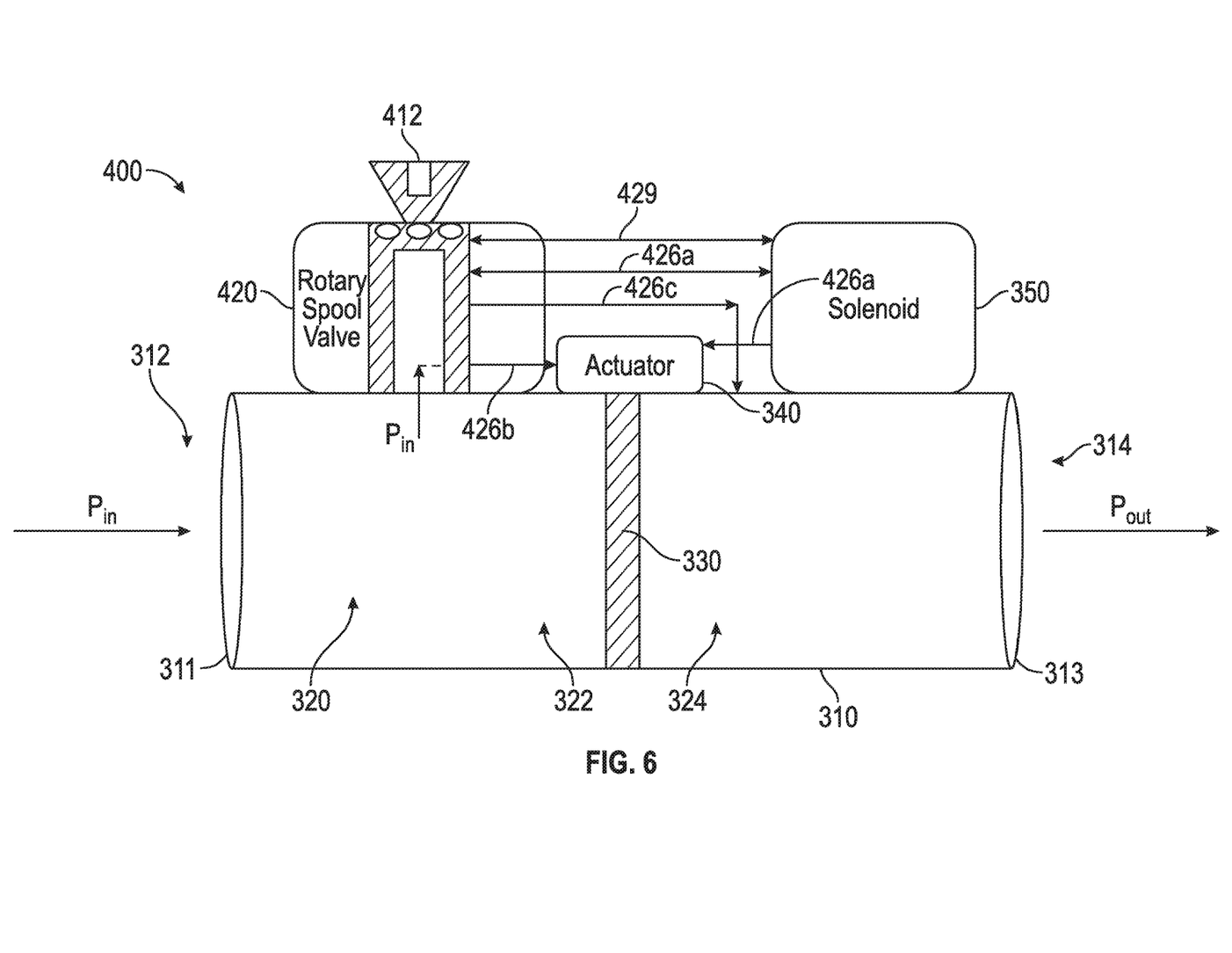
FIG. 6 is a block diagram of a starter air valve with the manual override of FIGS. 4-5, according to an embodiment of the disclosure.

Referring now to FIG. 6 with continued reference to FIGS. 1-5. FIG. 6 schematically illustrates a block diagram of a starter air valve 300. The starter air valve 300 includes a housing 310 comprising an inlet 312 at a first end 311 and an outlet 314 at a second end 313 opposite the first end 311. The inlet 312 is fluidly connected to the outlet 314 through a fluid pathway 320. A valve disk 330 is projecting into the fluid pathway 320 dividing the fluid pathway 320 into a first chamber 322 and a second chamber 324. The valve disk 330 in operation adjusts fluid flow through the fluid pathway 320. The valve disk 330 may be a butterfly valve or any other similar valve known to one of skill in the art. The starter air valve 300 also includes an actuator 340 operably connected to the valve disk 330 and a solenoid 350 in variable electrical connection with the rotary spool valve 420. The starter air valve 300 further includes a manual override 400 composed of a rotary spool valve 420 fluidly connected to the first chamber 322 of the fluid pathway 320. The rotary spool valve 420 is in variable fluid connection with the actuator 340, thus the rotary spool valve 420 will adjust the amount of air conveyed to the actuator 340 depending on the positional setting 432, 434, 436 of the rotary spool valve 420. The solenoid 350 is in variable electrical connection with the rotary spool valve 420, thus the solenoid 350 will disconnect/connect electrically to the spool valve 420 depending on the positional setting 432, 434, 436 of the rotary spool valve 420.

The manual override 400 is used in normal operation of the air starter valve 300 when the rotary spool valve 420 is in the normal start position 432. The rotary spool valve 420 of the manual override 400 may be pre-set to default to the normal start position 432 by a biasing mechanism, such as, for example, a torsion spring. In the normal start position 432, the rotary spool valve 420 electrically connects to the solenoid 350 at 429. During normal operation, the solenoid 350 will receive electrical commands through an engine controller (i.e. FADEC) to pulse width modulate the solenoid 350 during bowed rotor motoring in order to maintain the valve disk 330 at a specified angle to achieve the required airflow through the fluid pathway 320. Once the bowed rotor motoring is completed then the valve disk 330 is fully opened to complete full start. The rotary spool valve 420 is also fluidly connected to the actuator 340 through the solenoid 350 when the rotary spool 430 valve is in the normal start position 432. Compressed air enters the inlet 312 at an inlet pressure $P_{in}$ and is conveyed to the actuator 340 through the rotary spool 430 valve and the solenoid 350. While in the normal start position 432 the inlet pressure $P_{in}$ provides additional force upon to actuator to assist the solenoid 350 in pulse width modulation and positioning of the valve disk 330.

When a failure has occurred in the air starter valve 300, the rotary spool valve 420 may be rotated to either the full manual override position 434 or one of the plurality of partial manual override positions 436. In the full manual override position 434, the rotary spool valve 420 electrically disconnects from the solenoid 350. The rotary spool valve 420 is fluidly connected to the actuator 340 when the rotary spool valve 420 is in the full manual override start position 434. While in the full manual override position 434 full inlet pressure $P_{in}$ is applied to the actuator 340 in order to force the actuator to move the valve disk 330 to a full open position.

In each of the partial manual override positions 436, the rotary spool valve 420 electrically disconnects from the solenoid 350. The rotary spool valve 420 is also fluidly disconnected from the actuator 340 when the rotary spool valve 420 is in each of the partial manual override start valve positions 436. The first chamber 322 is in fluid connection to the second chamber 324 through the rotary spool valve 420 when the rotary spool valve 424 is in each of the partial manual override start positions 436. As discussed further below, each of the partial manual override start positions 436 allows a different amount of fluid through the rotary spool valve 420.

Advantageously, the plurality of partial manual override positions 436 allows the starter air valve 300 to motor the engine 250 at a specified speed below idle. In an example, the settings are determined by the pilot of the aircraft and are based on ambient conditions and state of the engine 250 upon shut down. Once the pilot decides what the manual override 400 should be set to, the pilot communicates the result to the technician and the technician rotates the rotary spool valve 420 at the tool interface 412 to that particular setting for the duration of the motoring sequence. Once motoring sequence completed, the technician sets the manual override 400 to the normal start position 432 in order to complete the starting sequence.

Figure 7:
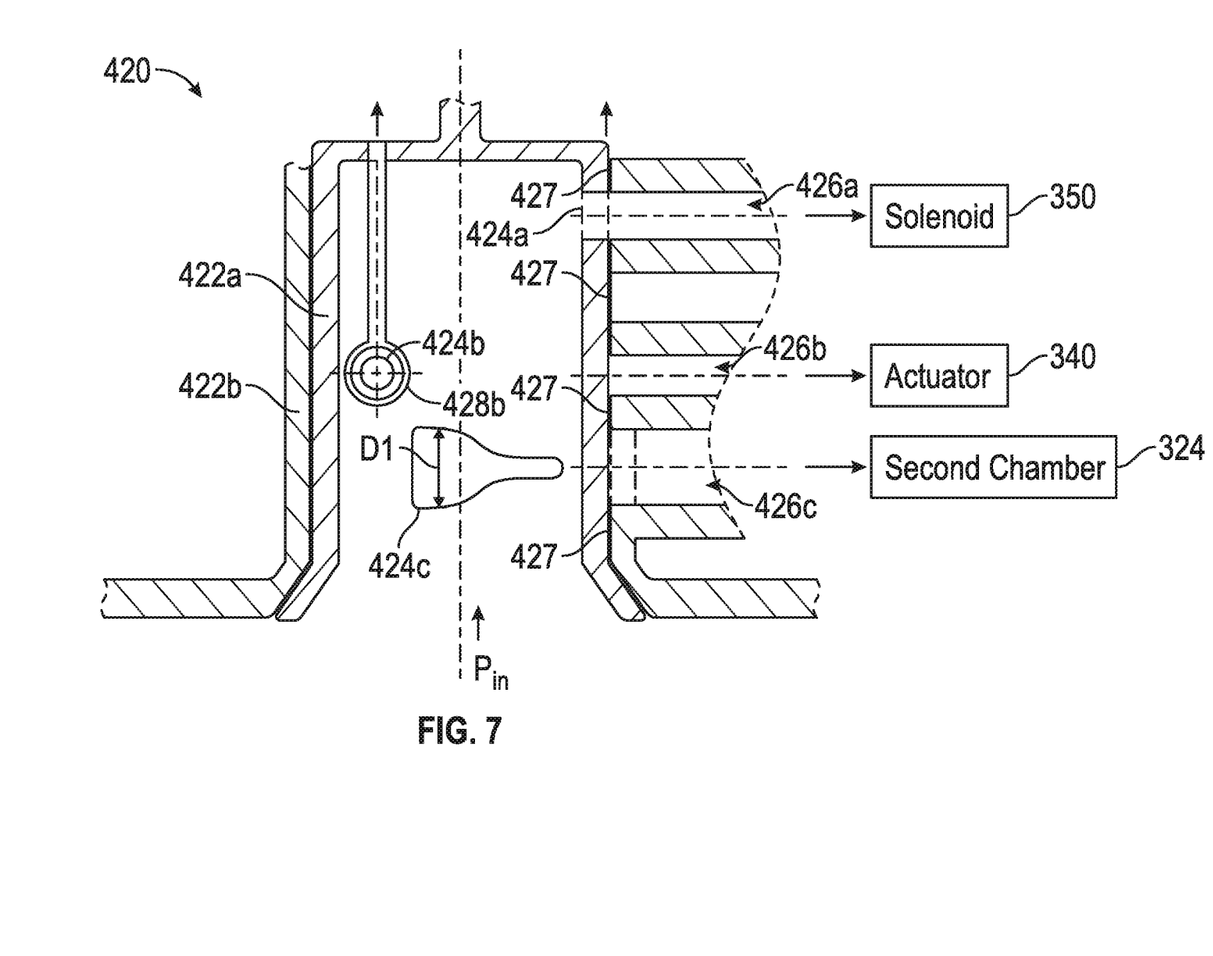
FIG. 7 is a cross-sectional view of a rotary spool valve for use in the starter air valve of FIG. 6, according to an embodiment of the present disclosure.
Figure 8:
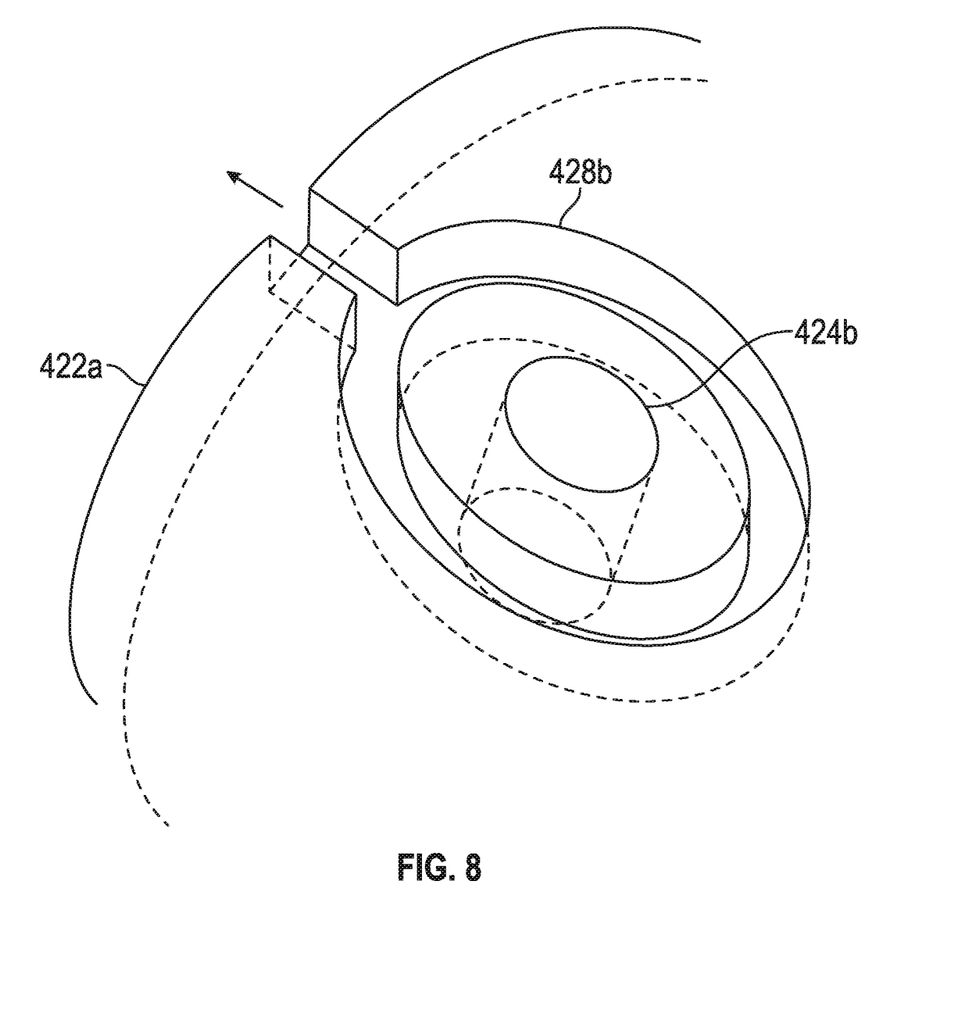
FIG. 8 is a schematic illustration of an orifice and vent channel of the rotary spool valve of FIG. 7, according to an embodiment of the present disclosure.

Referring now to FIGS. 7 and 8 with continued reference to FIGS. 1-6. FIG. 7 schematically illustrates a cross-section of the rotary spool valve 420. As seen in FIG. 7, the rotary spool valve 420 includes an inner cylinder 422a and an outer cylinder 422b. The inner cylinder contains a first orifice 424a, a second orifice 424b, and a variable slot orifice 424c. Each orifice 424a-424c lines up with a different fluid pathway 426a-426c in the outer cylinder 422b as the rotary spool valve 420 is rotated.

When in the normal start position 432, the first orifice 424a aligns with the first fluid pathway 426a. The first fluid pathway 426a is fluidly connected to the solenoid 350, thus when the rotary spool valve 420 is in the normal start position 432, inlet pressure $P_{in}$ is conveyed from the inlet 312 through the rotary spool valve 420 to the solenoid 350.

When in the full manual override position 434, the second orifice 424b aligns with the second fluid pathway 426b. The second fluid pathway 426b is fluidly connected to the actuator 340, thus when the rotary spool valve 420 is in the full manual override position 434, inlet pressure $P_{in}$ is conveyed from the inlet 312 through the rotary spool valve 420 to the actuator 340. The second orifice 424b may include a venting channel 428b placed around the second orifice 424b, as seen in FIGS. 7 and 8. Advantageously, the venting channel 428b helps prevent inlet pressure $P_{in}$ leakage through the area between the inner cylinder 422a and the outer cylinder 422b as inlet pressure flows $P_{in}$ into the second fluid pathway 426b to the actuator 340. For illustrative purposes, the venting channel 428b is shown located on the inner cylinder 422a of the rotary spool valve 420, however venting channels may also be located on the outer cylinder 422b or on a wall 427 opposite the outer cylinder 422b. As seen in FIG. 7, the wall 427 includes the orifices 426a, 426b, 426c.

When in each of the partial manual override positions 436, the variable slot orifice 424c aligns with the third fluid pathway 426c. The third fluid pathway 426c is fluidly connected to the second chamber 324, thus when the rotary spool valve 420 is in each of the partial manual override positions 436, inlet pressure $P_{in}$ is conveyed from the inlet 312 through the rotary spool valve 420 to the second chamber 324. The variable slot orifice 424c has a variable opening breadth D1 and will allow a different amount of inlet pressure $P_{in}$ to flow through to the third fluid pathway 426c in each manual override position 436. In an example, there may be 10 partial manual override position 436 numbered 1-10, as seen in FIG. 4 and each higher number may allow a greater amount of fluid flow through the variable slot orifice 424c than the previous lower number (e.g. "8" will allow more fluid flow than "7").

As described above, embodiments can be in the form of processor-implemented processes and devices for practicing those processes, such as a processor. Embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the exemplary embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A starter air valve comprising:
a housing comprising an inlet at a first end and an outlet at a second end opposite the first end, the inlet being fluidly connected to the outlet through a fluid pathway;
a valve projecting into the fluid pathway dividing the fluid pathway into a first chamber and a second chamber, the valve in operation adjusts fluid flow through the fluid pathway;
an actuator operably connected to the valve;
a solenoid; and
a rotary spool valve fluidly connected to the first chamber of the fluid pathway, the rotary spool valve operable to rotate to at least one of a normal start position, a full manual override position, and a plurality of partial manual override positions,
wherein the rotary spool valve is in variable fluid connection with the actuator,
wherein the rotary spool valve is fluidly connected to the actuator through the solenoid when the rotary spool valve is in the normal start position,
wherein the rotary spool valve is fluidly connected to the actuator when the rotary spool valve is in the full manual override start position, and
wherein the rotary spool valve is fluidly disconnected from the actuator when the rotary spool valve is in each of the plurality of partial manual override start positions.

2. The starter air valve of claim 1, wherein:
the rotary spool valve electrically connects to the solenoid to the actuator when the rotary spool valve is in the normal start position.

3. The starter air valve of claim 1, wherein:
the rotary spool valve electrically disconnects from the solenoid when the rotary spool valve is in the full manual override position.

4. The starter air valve of claim 1, wherein:
the rotary spool valve electrically disconnects from the solenoid when the rotary spool valve is in each of the plurality of partial manual override positions.

5. The starter air valve of claim 1, wherein:
the first chamber is in fluid connection to the second chamber through the rotary spool valve when the rotary spool valve is in each of the plurality of partial manual override start positions; and
each of the plurality of partial manual override start positions allows a different amount of fluid through the rotary spool valve.

6. The starter air valve of claim 5, wherein:
the rotary spool valve electrically disconnects from the solenoid when the rotary spool valve is in each of the plurality of partial manual override positions.

7. An engine starting system for a gas turbine engine comprising:
an air turbine starter;
a compressed air source fluidly connected to the air turbine starter;
a starter air valve fluidly connecting the air turbine starter to the compressed air source, the starter air valve comprising:
a housing comprising an inlet at a first end and an outlet at a second end opposite the first end, the inlet being fluidly connected to the outlet through a fluid pathway;
a valve projecting into the fluid pathway dividing the fluid pathway into a first chamber and a second chamber, the valve in operation adjusts fluid flow through the fluid pathway;

an actuator operably connected to the valve;

a solenoid; and a rotary spool valve fluidly connected to the first chamber of the fluid pathway, the rotary spool valve operable to rotate to at least one of a normal start position, a full manual override position, and a plurality of partial manual override positions, wherein the rotary spool valve is in variable fluid connection with the actuator, wherein the rotary spool valve is fluidly connected to the actuator through the solenoid when the rotary spool valve is in the normal start position, wherein the rotary spool valve is fluidly connected to the actuator when the rotary spool valve is in the full manual override start position, and wherein the rotary spool valve is fluidly disconnected from the actuator when the rotary spool valve is in each of the plurality of partial manual override start positions.

8. The engine starting system of claim 7, wherein:
the rotary spool valve electrically connects to the solenoid when the rotary spool valve is in the normal start position.

9. The engine starting system of claim 7, wherein:
the rotary spool valve electrically disconnects from the solenoid when the rotary spool valve is in the full manual override position.

10. The engine starting system of claim 7, wherein:
the rotary spool valve electrically disconnects from the solenoid when the rotary spool valve is in each of the plurality of partial manual override positions.

11. The engine starting system of claim 7, wherein:
the first chamber is in fluid connection to the second chamber through the rotary spool valve when the rotary spool valve is in each of the plurality of partial manual override start positions; and
each of the plurality of partial manual override start positions allows a different amount of fluid through the rotary spool valve.

12. The engine starting system of claim 11, wherein:
the rotary spool valve electrically disconnects from the solenoid when the rotary spool valve is in each of the plurality of partial manual override positions.

* * * * *